(12) United States Patent
Kim et al.

(10) Patent No.: US 8,953,343 B2
(45) Date of Patent: Feb. 10, 2015

(54) POWER SUPPLY APPARATUS HAVING MULTIPLE OUTPUTS

(75) Inventors: Jin-Ha Kim, Seongnam-si (KR); Joong-Gi Kwon, Gunpo-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 807 days.

(21) Appl. No.: 12/662,892

(22) Filed: May 10, 2010

(65) Prior Publication Data

US 2010/0220504 A1    Sep. 2, 2010

Related U.S. Application Data

(63) Continuation-in-part of application No. 11/953,154, filed on Dec. 10, 2007, now Pat. No. 7,852,641.

(30) Foreign Application Priority Data

Apr. 30, 2007 (KR) .......................... 10-2007-0042191

(51) Int. Cl.
   *H02M 3/335*    (2006.01)

(52) U.S. Cl.
   CPC ................................ *H02M 3/33507* (2013.01)
   USPC ..................................... 363/21.15; 363/21.12

(58) Field of Classification Search
   USPC ............... 363/21.12–21.15, 21.17–21.18, 363/21.06–21.07, 21.14–21.15, 127, 49
   See application file for complete search history.

(56) References Cited

U.S. PATENT DOCUMENTS

| | | | | |
|---|---|---|---|---|
| 4,400,767 A | * | 8/1983 | Fenter | 363/21.15 |
| 4,459,651 A | * | 7/1984 | Fenter | 363/21.18 |
| 5,282,122 A | * | 1/1994 | Summer | 363/21.15 |
| 5,283,441 A | * | 2/1994 | Fabian | 250/551 |
| 5,414,611 A | * | 5/1995 | Muto et al. | 363/21.15 |
| 5,621,623 A | * | 4/1997 | Kuriyama et al. | 363/20 |

(Continued)

FOREIGN PATENT DOCUMENTS

| | | |
|---|---|---|
| CN | 1487657 A | 4/2004 |
| CN | 1905342 A | 1/2007 |

(Continued)

OTHER PUBLICATIONS

U.S. Appl. No. 11/953,154, filed Dec. 10, 2007, Jin-Ha Kim.

(Continued)

*Primary Examiner* — Adolf Berhane
*Assistant Examiner* — Henry Lee, III
(74) *Attorney, Agent, or Firm* — Staas & Halsey LLP

(57) ABSTRACT

A power supply apparatus having multiple outputs which includes a transformer, a first output circuit generating a first output voltage with respect to a power transferred to a secondary side of the transformer, and a first output controller generating a first control signal for controlling a power supply provided to a primary side of the transformer. The power supply apparatus further includes a second output circuit generating a second output voltage with respect to the power transferred to the secondary side of the transformer and a second output controller controlling an output of the second output voltage, wherein the second output circuit includes a second switch performing a switching operation on current flows of the second output circuit, and the second output controller controls the switching operation of the second switch according to the first control signal and the second output voltage.

18 Claims, 9 Drawing Sheets

(56) References Cited

U.S. PATENT DOCUMENTS

| | | | |
|---|---|---|---|
| 5,675,485 A * | 10/1997 | Seong | 363/97 |
| 5,982,640 A * | 11/1999 | Naveed et al. | 363/21.15 |
| 6,069,804 A | 5/2000 | Ingman et al. | |
| 6,330,169 B2 * | 12/2001 | Mullett et al. | 363/16 |
| 6,563,718 B1 * | 5/2003 | Li et al. | 363/16 |
| 6,577,512 B2 * | 6/2003 | Tripathi et al. | 363/21.17 |
| 6,594,161 B2 * | 7/2003 | Jansen et al. | 363/21.14 |
| 6,650,028 B1 * | 11/2003 | Cornelius | 307/87 |
| 6,671,189 B2 * | 12/2003 | Jansen et al. | 363/21.14 |
| 6,693,811 B1 * | 2/2004 | Bowman et al. | 363/97 |
| 6,845,018 B2 | 1/2005 | Ohishi | |
| 6,950,950 B2 * | 9/2005 | Sawyers et al. | 713/300 |
| 7,158,392 B2 * | 1/2007 | Hosokawa et al. | 363/21.06 |
| 7,515,442 B2 | 4/2009 | Mikulenka et al. | |
| 7,675,762 B2 * | 3/2010 | Kwon | 363/21.14 |
| 2004/0046536 A1 | 3/2004 | Librizzi | |
| 2006/0002155 A1 * | 1/2006 | Shteynberg et al. | 363/21.12 |
| 2006/0139965 A1 * | 6/2006 | Gan et al. | 363/20 |
| 2007/0025031 A1 | 2/2007 | Kwon | |
| 2007/0127277 A1 * | 6/2007 | Fujiwara | 363/59 |
| 2011/0181112 A1 | 7/2011 | Kwon | |

FOREIGN PATENT DOCUMENTS

| | | |
|---|---|---|
| JP | 8-33328 | 2/1996 |
| JP | 2000-217356 | 8/2000 |
| JP | 2002-136141 | 5/2002 |
| KR | 10-2007-0014012 | 1/2007 |

OTHER PUBLICATIONS

Advisory Action dated Aug. 19, 2010 for related U.S. Appl. No. 11/953,154.

Notice of Allowance dated Sep. 22, 2010 for related U.S. Appl. No. 11/953,154.

Korean Office Action for corresponding Korean Patent Application No. 10-2007-0042191 dated Oct. 6, 2011.

Office Action mailed Nov. 30, 2009 for related U.S. Appl. No. 11/953,154.

Chinese Office Action issued Mar. 1, 2012 in corresponding Chinese Patent Application 200810074104.1.

Korean Notice of Allowance iasued Jan. 16, 2012 in corresponding Korean Patent Application 10-2007-0042191.

Final Office Action dated Jun. 8, 2010 for related U.S. Appl. No. 11/953,154.

* cited by examiner

POWER SUPPLY APPARATUS HAVING MULTIPLE OUTPUTS

CROSS-REFERENCE TO RELATED APPLICATIONS

This application claims the benefit of Korean Patent Application No. 10-2007-0042191, filed on Apr. 30, 2007, in the Korean Intellectual Property Office, the disclosure of which is incorporated herein in its entirety by reference. This application is a continuation-in-part application of U.S. serial application Ser. No. 11/953,154 filed Dec. 10, 2007 now U.S. Pat. No. 7,852,641 and incorporated by reference herein.

BACKGROUND

1. Field

One or more embodiments of the present disclosure relate to a power supply apparatus having multiple outputs, and more particularly, to a power supply apparatus having multiple outputs capable of individually controlling multiple output voltages using a simple structure.

2. Description of the Related Art

In general, apparatuses such as a computer, an image forming apparatus such as a printer or a copier, a monitor, or a communication terminal require an efficient power supply system which has a simple structure and a small size and can provide a stable power supply. A current source type power supply apparatus has been widely used as an efficient power supply system.

FIG. 1 is a circuit diagram for explaining basic operations of the current source type power supply apparatus. A circuit as illustrated in FIG. 1 is known as a flyback converter which is a type of DC/DC converter.

Referring to FIG. 1, the current source type power supply apparatus includes a transformer T having a predetermined turns ratio, a primary circuit 10 connected to a primary coil of the transformer T, that is, connected to an input-side coil, and a secondary circuit 20 connected to a secondary coil of the transformer T, that is, connected to an output-side coil. Here, the primary circuit 10 and the secondary circuit 20 can be insulated from each other by the transformer T.

The primary circuit 10 includes a control switch S connected in series between the primary coil of the transformer T and a grounding terminal. Here, the control switch S performs a switching operation on an input voltage in response to a control signal applied from an output voltage controller 30 in order to control energy charging or transferring operations of the transformer T.

The secondary circuit 20 includes a rectifier 21 for rectifying currents transmitted from the transformer T. The rectifier 21 includes a diode D connected to the secondary coil of the transformer T and a capacitor C. Here, output terminals are formed at both end portions of the capacitor C. Therefore, an external load can be connected in parallel to the both end portions of the capacitor C. In addition, although not shown in the figure, the secondary circuit 20 may further include a filter for filtering high frequency noise and electromagnetic interference (EMI) and an output voltage control circuit.

When the control switch S included in the primary circuit 10 is turned on, a voltage having an opposite polarity to that of the primary coil is induced in the secondary coil of the transformer T, so that the diode D of the rectifier 21 is in a reverse bias state. Therefore, a current flow to the secondary circuit 20 is blocked, and simultaneously, a magnetic inductance of the transformer T is charged with energy. More specifically, when the control switch S is in the ON state, current transfer by the transformer T does not occur, and energy supplied to the primary coil is charged to the magnetic inductance of the transformer T.

On the other hand, when the control switch S is turned off, a voltage having an opposite polarity to that in the ON state is induced in the secondary coil of the transformer T, so that the diode D of the secondary circuit 20 is in the ON state. Therefore, currents of the magnetic inductance with which the transformer T is charged are transmitted to the secondary circuit 20, and a DC voltage rectified by the rectifier 21 is output to the output terminal.

The output terminal of the secondary circuit 20 is connected to an output voltage controller 30. The output voltage controller 30 feeds an output voltage of the secondary circuit 20 back to the control switch S to apply a control signal to the control switch S. Here, the control signal is a signal for controlling a duty rate of the control switch S. Therefore, by controlling operations of the control switch S, the output voltage can be controlled.

As described above, the current source type power supply apparatus 20 works on a principle whereby magnetic inductance components of the transformer T are used as a boost inductor to charge the magnetic inductance of the transformer T when the control switch S included in the primary circuit 1 is turned on and to supply a DC output voltage that is rectified while currents of the magnetic inductance charged when the control switch S is turned off are transmitted to the secondary coil of the transformer T.

Therefore, the transformer T is used for the secondary circuit 20 as a current source that periodically supplies currents, so that the power supply apparatus working on the above described principle is called the current source type power supply apparatus. Besides the aforementioned flyback converter, the current source type power supply apparatus may be of various types according to an additional circuit configuration of the primary circuit.

As compared with other types of power supply apparatus, the rectifier of the secondary circuit of the current source type power supply apparatus has a simple structure and has a small number of components, so that it may be advantageous for the current source type power supply apparatus to use a multiple output structure. More specifically, for multiple outputs, a secondary circuit corresponding to each output has to be provided, so that the simple structure of the secondary circuit may cause a decrease in the size of the entire apparatus. Due to this advantage, various types of current source type power supply apparatuses having multiple outputs have been introduced.

However, the conventional current source type power supply apparatuses having multiple outputs use a number of transformers, include a number of regulator chips that may cause heavy losses in order to control a voltage output from each secondary circuit, or have complex structures in which an output voltage feedback circuit of each secondary circuit is connected to the primary circuit, so that the aforementioned advantage of the current source type power supply apparatus cannot be effectively applied.

SUMMARY

One or more embodiments of the present disclosure provide a power supply apparatus having multiple outputs capable of having a plurality of output circuits in the secondary side of a transformer, individually controlling an output voltage of each output circuit, increasing efficiency by reducing power losses, and having a simple configuration.

According to an aspect of the present disclosure, there is provided a power supply apparatus having multiple outputs which comprises a transformer, a first output circuit generating a first output voltage with respect to a power transferred to a secondary side of the transformer, and a first output controller generating a first control signal for controlling a power supply provided to a primary side of the transformer, the apparatus comprising: a second output circuit generating a second output voltage with respect to the power transferred to the secondary side of the transformer; and a second output controller controlling an output of the second output voltage, wherein the second output circuit includes a second switch performing a switching operation on current flows of the second output circuit, and the second output controller controls the switching operation of the second switch by turning off the second switch or feeding the second output voltage back to the second switch according to the first control signal.

According to another aspect of the present disclosure, there is provided a power supply apparatus having multiple outputs which includes a transformer, a first output circuit generating a first output voltage with respect to a power transferred to a secondary side of the transformer, and a first output controller generating a first control signal for controlling a power supply provided to a primary side of the transformer, the apparatus including: a second output circuit generating a second output voltage with respect to the power transferred to the secondary side of the transformer; and a second output controller controlling an output of the second output voltage, wherein the second output circuit includes a second switch performing a switching operation on current flows of the second output circuit, and the second output controller controls the switching operation of the second switch according to the first control signal and the second output voltage.

The apparatus may further include: a first photoelectric transformation unit photoelectric-converting an optical signal generated in response to the generated first output voltage into an electric signal, and outputting the electric signal to the first output controller; and a second photoelectric transformation unit photoelectric-converting an optical signal generated in response to the generated first control signal into an electric signal, and outputting the electric signal to the second output controller, wherein the second output controller may control the switching operation of the second switch according to the output of the second photoelectric transformation unit and the second output voltage.

The first and second photoelectric transformation units may be photo-couplers.

The second output controller of the apparatus may turn off the second switch in response to an externally applied second control signal.

The second output circuit may include a capacitor connected to the second switch, and wherein the second switch is connected in series to the secondary side of the transformer, and output terminals for outputting the second output voltages may be formed at both end portions of the capacitor.

The second switch may include a MOSFET (metal-oxide-semiconductor field-effect transistor) having a gate terminal connected to an output terminal of the second output controller.

The second switch may include a BJT (bipolar junction transistor).

The second output controller may include: an output voltage detector detecting the second output voltage; an error detector comparing the second output voltage detected by the output voltage detector with a predetermined reference voltage and outputting an error value according to the result of the comparing; and a pulse width modulator outputting a switching control signal for turning off the second switch, or outputting a switching control signal for controlling the switching operation of the second switch, according to the first control signal.

The pulse width modulator of the apparatus may output the switching control signal for turning off the second switch in response to an externally applied second control signal.

The output voltage detector may be a voltage divider circuit.

The reference voltage may be generated by a resistor or a zener diode connected between a predetermined voltage source and a grounding terminal.

The second output controller may further include a compensation circuit unit which provides a compensation circuit using negative feedback, and wherein the compensation circuit unit may be connected in parallel to an output terminal of the error detector and an input terminal of the error detector applied with the second output voltage and may include a resistor and a capacitor which are connected in series.

A primary circuit of the transformer may include a current source type switching circuit unit including a first switch that performs a switching operation in response to the first control signal.

The current source type switching circuit unit may be one of a flyback, active-clamp flyback, half-bridge flyback, and series-resonant type.

The current source type switching circuit unit may further include a snubber circuit for preventing leakage inductance of the transformer.

The first output circuit may include a rectifier for rectifying a power transferred from the transformer.

The rectifier may be one of a half-wave rectifying circuit and a full-wave rectifying circuit.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

Figure 1:
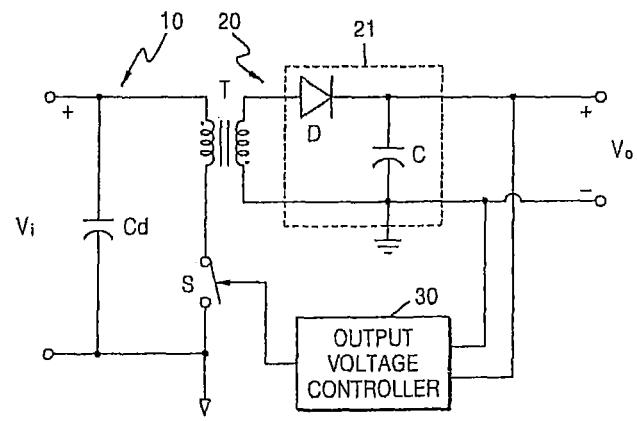
FIG. 1 is a circuit diagram for explaining basic operations of a conventional current source type power supply apparatus.

Hereinafter, exemplary embodiments of the present disclosure will be described in detail with reference to the attached drawings. Like reference numerals in the drawings denote like elements. Also, detailed descriptions of well known functions and structures may be omitted for convenience of explanation of the essentials of the present disclosure.

Figure 2:
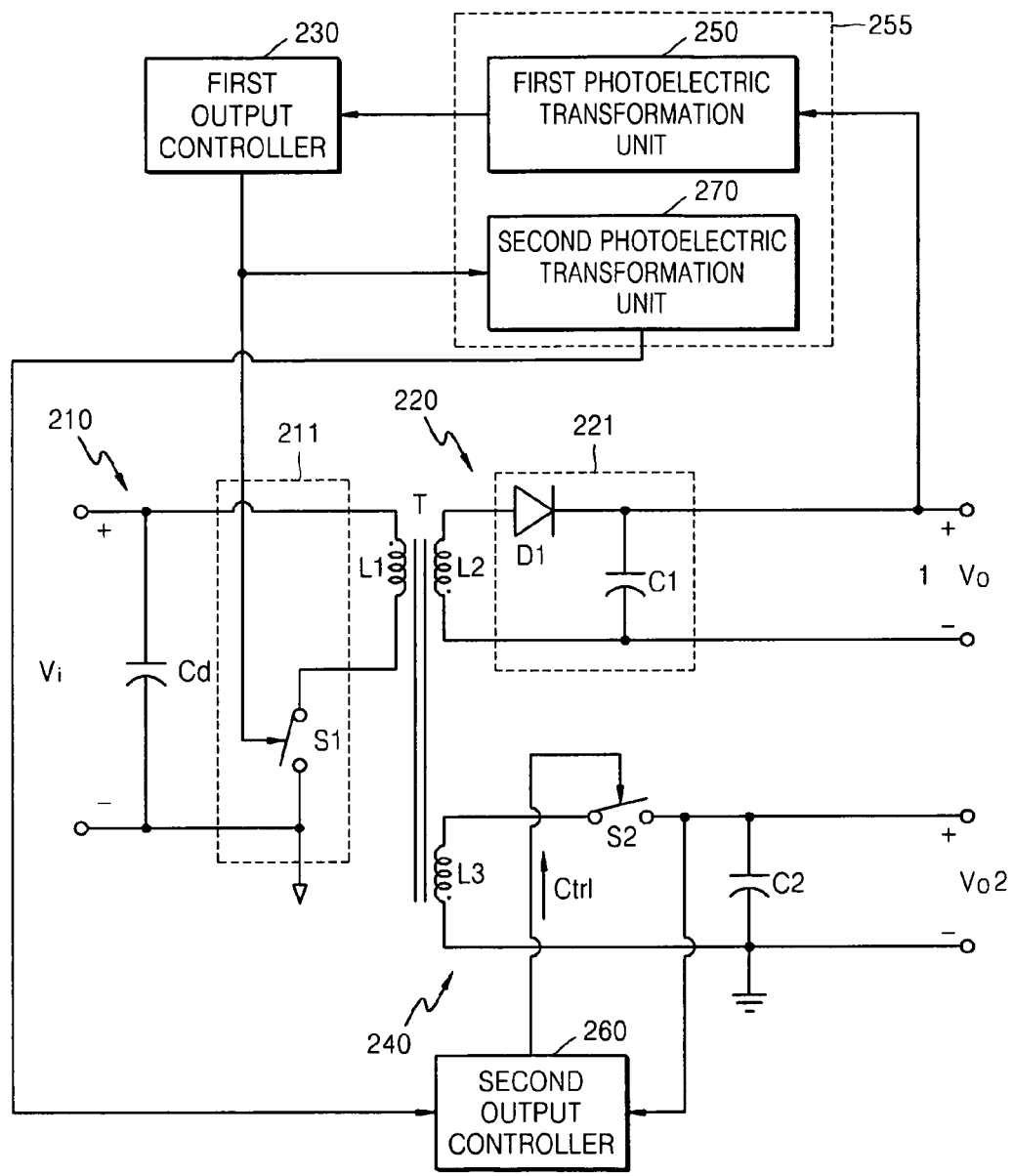
FIG. 2 is a circuit diagram for explaining a power supply apparatus having multiple outputs according to an embodiment of the present disclosure.

FIG. 2 is a circuit diagram for explaining a power supply apparatus having multiple outputs according to an embodiment of the present disclosure. According to the current embodiment, the power supply apparatus having 2 outputs is described. However, according to an environment, the power supply apparatus may be constructed to output N (N is a natural number) output voltages. When the number of outputs is N, a transformer includes N secondary coils, and each of the N secondary coils may be connected to each secondary output circuit.

As illustrated in FIG. 2, the power supply apparatus having multiple outputs includes a transformer T having a primary coil L1 and two secondary coils, and each secondary coil has a predetermined turn ratio to the primary coil L1, that is, a first coil L2 and a second coil L3.

The primary coil L1 is connected to a primary circuit 210, the first coil L2 in the secondary side is connected to a first output circuit 220, and the second coil L3 in the secondary side is connected to a second output circuit 240. Here, the primary circuit 210 is insulated from the first and second output circuits 220 and 240 in the secondary side by the transformer T, and first and second photoelectric transformation unit 250 and 270.

Here, the primary circuit 210 includes a current source type switching circuit unit 211 connected to the primary coil L1 of the transformer T. In this case, the current source type switching circuit unit 211 performs a switching operation in response to a first control signal applied from a first output controller 230 to control an energy charging or transferring operation of the transformer T. The first photoelectric transformation unit 250 photoelectric-converts an optical signal generated in response to the first output voltage into an electric signal and outputs the electric signal to the first output controller 230, and the first control signal is generated according to the electric signal output from the first photoelectric transformation unit 250. In other words, the first output controller 230 generates the first control signal by feeding back a first output voltage through the first photoelectric transformation unit 250. The first photoelectric transformation unit 250 is used to insulate the primary circuit 110 from the first output circuit 220 in the secondary side. The first photoelectric transformation unit 250 and the second photoelectric transformation unit 270 that will be described later may be photo couplers. The photo coupler includes a light emitting element and a light receiving element. The light emitting element may be a light emitting diode, and the light receiving element may be a photo transistor. The first and second photoelectric transformation unit 250 and 270 may be realized in one module 255, but are not limited thereto.

The current source type switching circuit unit 211 may include a first switch S1 connected between the primary coil L1 of the transformer T and a grounding terminal. When the first switch S1 is turned on, the secondary coils L2 and L3 of the transformer T are induced with a voltage having an opposite polarity to that of the primary coil. Accordingly, a diode D1 included in the first output circuit 220 is in a reverse bias state, and a current flow to the first output circuit 220 is blocked.

The first output controller 230 controls a power supply provided in the primary side of the transformer T according to the electric signal photoelectric-converted by the first photoelectric transformation unit 250 in response to the first output voltage generated by the first output circuit 220. In other words, the first output controller 230 feeds the first output voltage Vo1 back to the first switch S1 in order to apply the first control signal to the first switch S1. Here, the first control signal may represent a signal for controlling a duty rate of the first switch S1.

The second output controller 260 controls a switching operation of a second switch S2 according to the first control signal received from the first output controller 230 and a second output voltage. When the first control signal represents the ON state of the first switch S1, the second output controller 260 generates a switching control signal Ctrl for turning off a second switch S2 in order to apply the switching control signal Ctrl to the second switch S2. Therefore, when the first switch S1 is turned on, a current flow to the second output circuit 240 is blocked. Here, the first control signal is input to the second output controller 260 through the second photoelectric transformation unit 270. In other words, the second photoelectric transformation unit 270 photoelectric-converts an optical signal generated in response to the first control signal to an electric signal and outputs the electric signal to the second output controller 260. The second output controller 260 controls the second switch S2 by receiving not only the first control signal but also the second output voltage, and thus efficiency of close regulation may be increased.

As described above, when the first switch S1 is turned on, current flows to the secondary output circuits 220 and 240 are blocked, and simultaneously, a magnetic inductance of the transformer T is charged with energy. Specifically, in the ON state of the first switch S1, a current transfer by the transformer T does not occur, and the magnetic inductance of the transformer T is charged with the energy supplied to the primary coil.

On the contrary, when the first switch S1 is turned off, the secondary coils of the transformer T are induced with a voltage having an opposite polarity to that in the ON state. Accordingly, the diode D1 of the first output circuit 220 is in the ON state, so that a magnetic inductance current with which the transformer T is charged is transferred to the first output circuit 220.

The first output circuit 220 rectifies a power transmitted to the secondary side of the transformer T to generate a first output voltage. In order to do this, the first output circuit 220 includes a rectifier 221 for rectifying the power. Here, the first rectifier 221 may include the diode D1 connected in series to the first coil L2 in the secondary side of the transformer T and a first capacitor C1. Here, first output terminals for the first output voltage Vo1 may be formed at both end portions of the first capacitor C1. The rectifier 221 illustrated in FIG. 2 is a half-wave rectifier. According to the current embodiment, the first output circuit 220 may employ the half-wave rectifier. However, as described later, a full-wave rectifier can also be employed.

The second output circuit 240 rectifies currents transmitted from the transformer T to generate a second output voltage Vo2. In order to do this, the second output circuit 140 includes the second switch S2 and a second capacitor C2, and the second switch S2 performs a switching operation in response to a switching control signal Ctrl applied by the second output controller 260.

As described above, when the first control signal transmitted from the first output controller 230 represents the ON state of the first switch S1, the second output controller 260 generates a switching control signal Ctrl for turning off the second switch S2 to apply the switching control signal Ctrl to the second switch S2. However, when the first switch S1 is turned off, namely, when the first control signal transmitted from the first output controller 230 is for turning off the first switch S1, the second output controller 260 feeds the second output voltage Vo2 back to generate the switching control signal Ctrl for controlling the second switch S2 and to apply the switching control signal Ctrl to the second switch S2, so that the second output controller 260 can individually control the second output source voltage Vo2.

The second switch S2 may be implemented as a metal-oxide-semiconductor field-effect transistor (MOSFET) having a gate terminal connected to an output terminal of the second output controller 160 or as a bipolar junction transistor (BJT). When the MOSFET is employed, the second switch S2 receives the switching control signal Ctrl through the gate terminal and performs the switching operation.

As described above, when the first control signal represents the ON state of the first switch S1, namely, when the first switch S1 is turned on, energy supplied to the primary coil is charged to the magnetic inductance of the transformer T, and a voltage having an opposite polarity to that of the primary coil is induced in the secondary coil L3, the second switch S2 is turned off, so that currents transmitted from the transformer T are rectified so as to generate the second output voltage. In addition, when the first switch S1 is turned off and a voltage having an opposite polarity to that in the ON state is induced, the second switch S2 is controlled by the switching control signal Ctrl generated by performing the feedback process on the second output source voltage Vo2, so that the second output source voltage Vo2 can be individually controlled.

In addition, the second output controller 260 of the power supply apparatus having multiple outputs receives the second control signal that represents the power-off of the second output voltage and may generate the switching control signal Ctrl for turning off the second switch S2 in response to the second control signal. Here, when a system including the power supply apparatus having multiple outputs, for example, an image forming apparatus is required to be in a sleep mode that means a standby mode, the second control signal may be input from a central processing unit for controlling operations of the image forming apparatus. When it is assumed that the second output circuit 240 supplies a main power and the first output circuit 220 supplies an auxiliary power, this construction may be used as a unit for turning off the main power in the sleep mode of the image forming apparatus. As described above, in the sleep mode, power is not consumed in the output circuit for supplying the main power by turning off the switch included in the output circuit for supplying the main power, so that power consumed in the entire system can be reduced.

According to the current embodiment, when the first control signal transmitted from the first output controller 230 represents the ON state of the first switch S1, the second output controller 260 generates the switching control signal Ctrl for turning off the second switch S2, and when the first control signal transmitted from the first output controller 230 represents to turn off the first switch S2, the second output controller 260 feeds the second output voltage Vo2 back to generate the switching control signal Ctrl for controlling the second switch S2. However, it will be understood by those of ordinary skill in the art that according to a type of a current source type circuit unit included in the primary circuit 210, the switching control signal Ctrl generated by the second output controller 230 based on the first control signal transmitted from the first output controller 230 may be changed.

More specifically, when energy is supplied to the primary coil according to the first control signal transmitted from the first output controller 230, and reverse bias is correspondingly applied to the second switch S2, the switching control signal Ctrl is generated so as to turn off the second switch S2, and energy supplied to the primary coil is blocked according to the first control signal transmitted from the first output controller 230, and bias is correspondingly applied to the second switch S2, the second output source voltage Vo2 is fed back to generate the switching control signal Ctrl for controlling the second switch S2. In this case, as described above, the first control signal is generated according to the electric signal obtained in the first photoelectric transformation unit 250, and the switching control signal Ctrl is generated according to the first control signal and the second output voltage received through the second photoelectric transformation unit 270.

The second switch S2 may be replaced with a diode or a switch connected in series to the diode, the diode and the second capacitor C2 may perform a function of rectifying a power transferred from the transformer T, and the switch may perform a function of controlling the second output voltage Vo2. However, in this case, power losses occur due to a voltage drop of the diode, and efficiency of the entire power circuit can be degraded. In addition, since the diode is added, costs increase. According to the current embodiment, the diode is not used, and the switching operation of the second switch S2 is controlled according to the switching control signal of the second output controller 260 as described above, so that currents transmitted from the transformer T can be rectified and simultaneously the second output voltage Vo2 can be individually controlled. Therefore, power losses in the second output circuit 240 are reduced and the efficiency is increased, a simple circuit structure can be implemented, and costs can be reduced.

Figure 3:
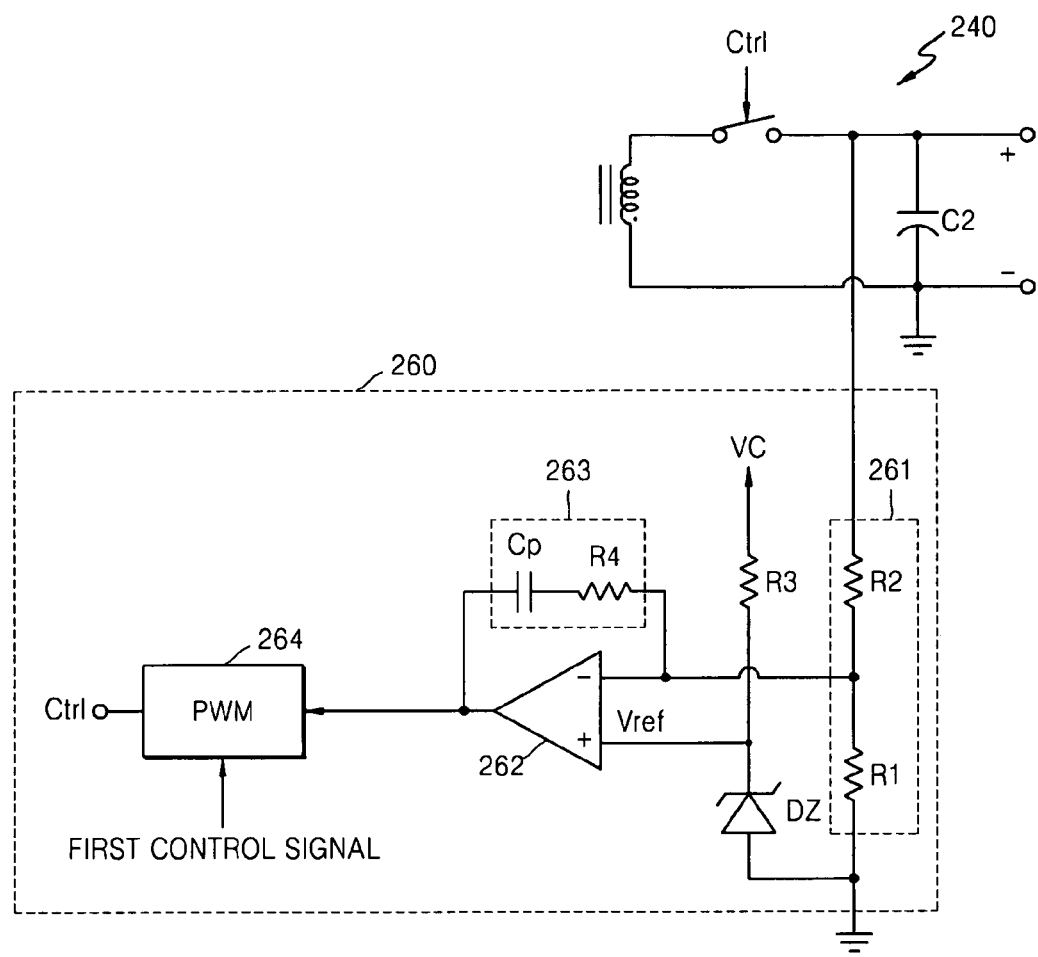
FIG. 3 is a circuit diagram illustrating a circuit configuration of a second output controller illustrated in FIG. 2 according to an embodiment of the present disclosure.

FIG. 3 is a circuit diagram illustrating a circuit configuration of a second output controller 260 illustrated in FIG. 2 according to an embodiment of the present disclosure. Referring to FIG. 3, the second output controller 260 may include an output voltage detector 260, an error detector 262, a compensation circuit unit 263, a frequency synchronization unit 264, and a pulse width modulator (PWM) 265.

The output voltage detector 261 detects the second output voltage Vo2 as a predetermined voltage ratio so as to be provided to the error detector 262. The output voltage detector 261 may include two resistors connected to an output terminal, that is, may be constructed as a voltage divider circuit having a first resistor R1 and a second resistor R2.

The error detector 262 performs functions of comparing a detection voltage provided from the output voltage detector 261 with a predetermined reference voltage Vref, amplifying an error value thereof, and outputting the error value. The error detector 262 may be a comparator.

The desired reference voltage Vref, for example, a voltage of 2.5 V is input to a first input terminal of the error detector 262. Here, the reference voltage Vref may be generated by a third resistor R3 and a zener diode DZ connected between a voltage source Vc and a grounding terminal. In addition, the detection power provided from the output voltage detector 261 is input to a second input terminal of the error detector 262.

The compensation circuit unit 263 provides a compensation circuit using negative feedback to stabilize a circuit of the second output controller 260. The compensation circuit unit 263 is connected in parallel to the output terminal of the error detector 262 and the second input terminal and may include a fourth resistor R4 and a capacitor Cp that are connected in series.

The PWM 264 generates the switching control signal Ctrl for controlling the second switch S2 to be turned on or off based on the first control signal transmitted from the first output controller and the output signal of the error detector 262. For example, when the first control signal represents the ON state of the first switch S1, the PWM 265 generates the switching control signal Ctrl for turning off the second switch S2, and when the first control signal represents the OFF state of the first switch S1, the PWM 265 generates the switching control signal Ctrl for controlling the ON or OFF state of the second switch S2 according to the output signal of the error detector 262.

When the switching control signal Ctrl for controlling the ON or OFF state of the second switch S2 is generated according to the output signal of the error detector 262, widths of the ON interval and the OFF interval of the switching control signal Ctrl are controlled by an error value provided from the error detector 262. As described above, the second output voltage Vo2 is fed back, and the ON state of current flowing through the second switch S2 is controlled according to a magnitude of the second output voltage Vo2, so that the amount of current provided to a second output circuit terminal can be controlled and a magnitude of the second output voltage Vo2 can be controlled to have a desired value.

As described above, when the second output controller 260 of the power supply apparatus having multiple outputs receives the second control signal that represents the OFF state of the second output voltage and generates the switching control signal Ctrl for turning off the second switch S2 in response to the second control signal, the PWM 265 generates the switching control signal Ctrl for turning off the second switch S2 in response to the second control signal.

Figure 4:
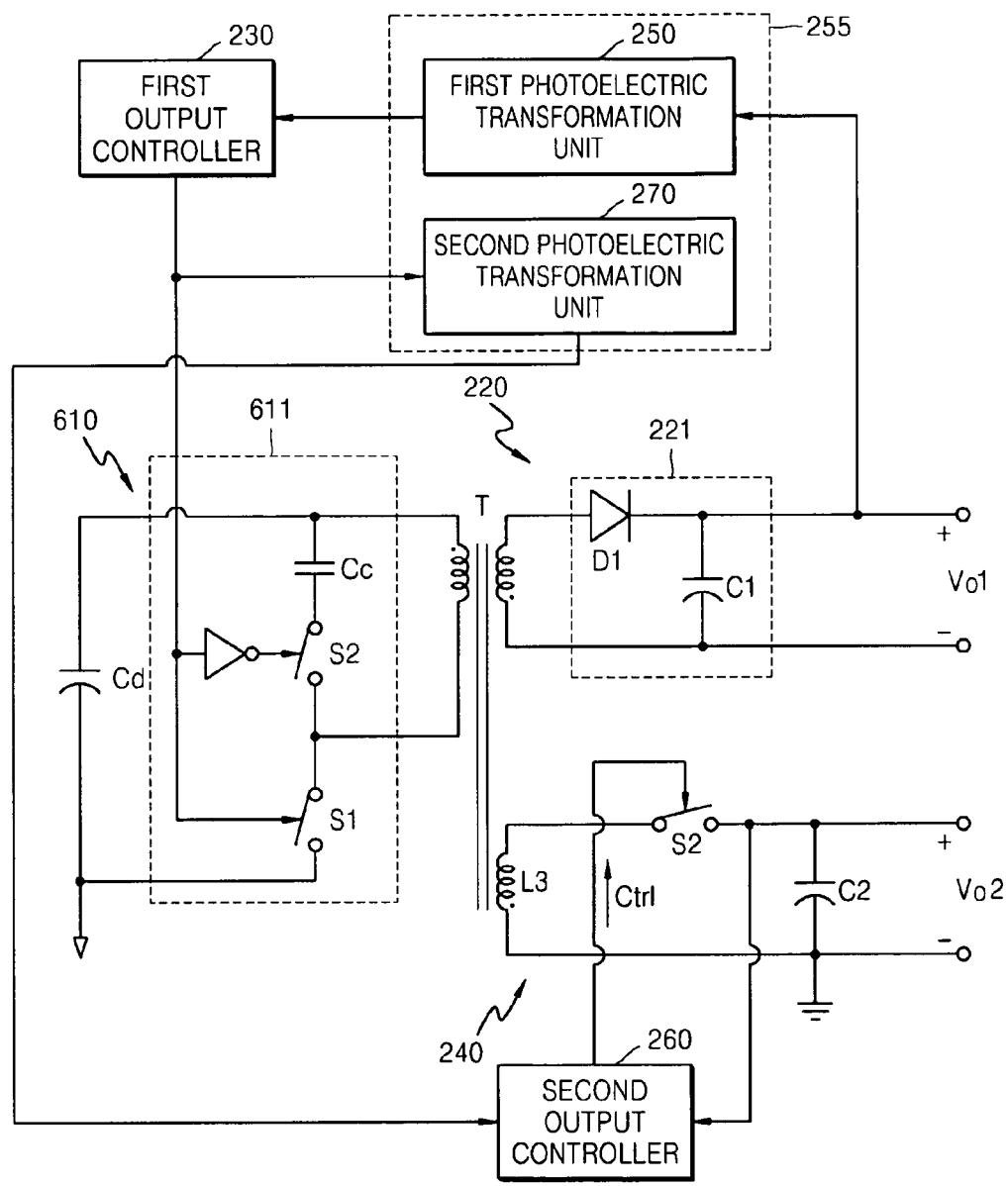
FIG. 4 is a circuit diagram for explaining a power supply apparatus having multiple outputs according to another embodiment of the present disclosure.

FIG. 4 is a circuit diagram for explaining a power supply apparatus having multiple outputs according to another embodiment of the present disclosure. In FIG. 4, the current source type switching circuit unit is configured to have an active-clamp flyback type circuit.

A current source type switching circuit unit 611 of a current source type power supply apparatus 610 illustrated in FIG. 4 additionally includes an active snubber circuit that can prevent switching losses due to leakage inductance of the transformer T.

Specifically, the current source type switching circuit unit 611 is connected in parallel to both end portions of the primary coil of the transformer T and includes a capacitor Cc and a second switch S2 which are connected in series. Here, the second switch S2 and a first switch S1 operate complementarily to each other and have a short dead time.

A second output controller 260 illustrated in FIG. 4 is the same as the second output controller 260 described with reference to FIG. 2.

When the first switch S2 is turned on, energy is stored in the transformer T, and when the first switch S1 is turned off, the energy stored in the transformer T is transferred to secondary circuits 220 and 240. Leakage inductance of the transformer T and the energy stored in the magnetic inductance enable the first switch S2 and the second switch S2 to perform a zero voltage switching operation. In addition, while currents flow through the secondary coil of the transformer T, the capacitor Cc connected in series to the second switch S2 resonates with the leakage inductance of the transformer T.

Figure 5:
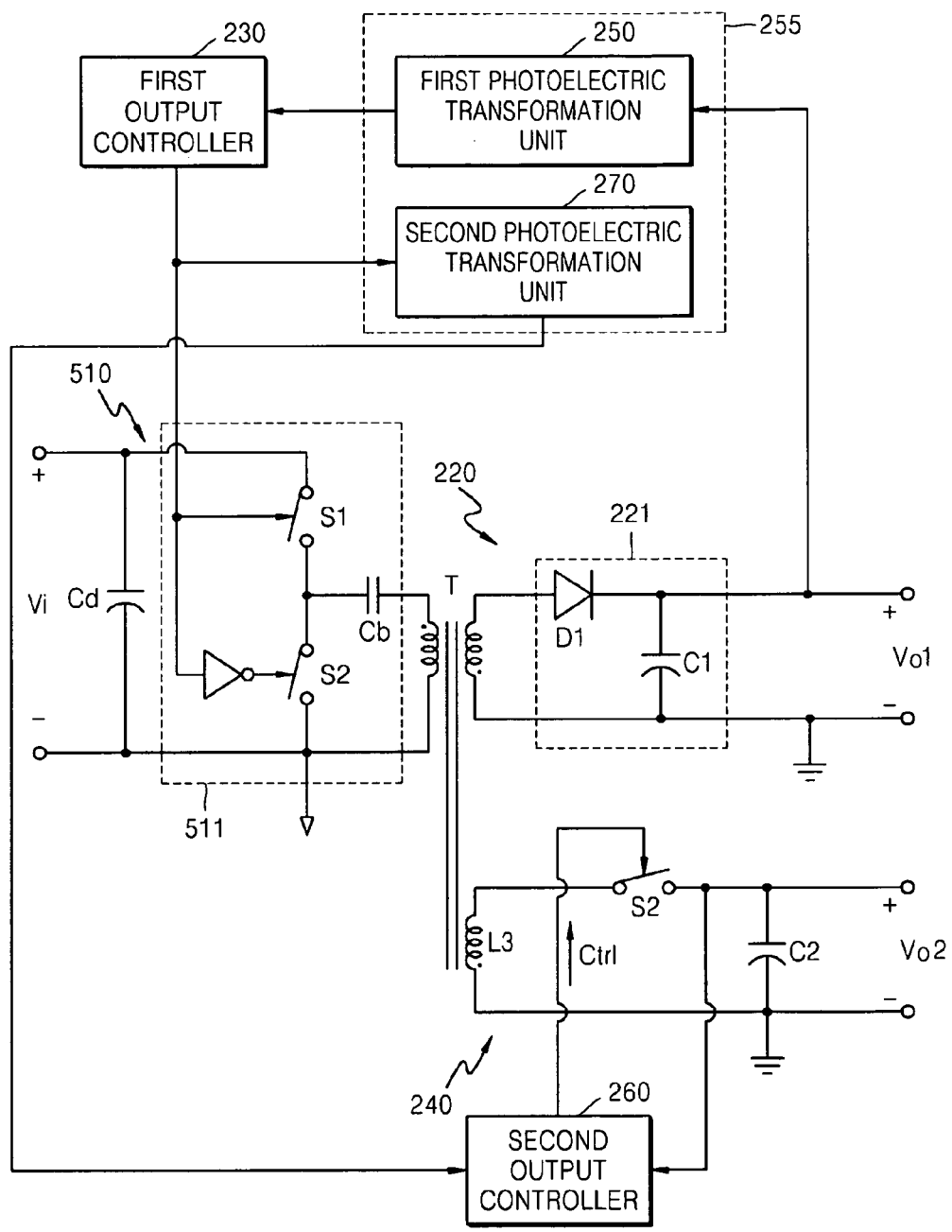
FIG. 5 is a circuit diagram for explaining a power supply apparatus having multiple outputs according to another embodiment of the present disclosure.

FIG. 5 is a circuit diagram for explaining a power supply apparatus having multiple outputs according to another embodiment of the present disclosure. In FIG. 5, the current source type switching circuit unit is configured to have a half-bridge flyback type circuit.

A second output controller 260 illustrated in FIG. 5 is the same as the second output controller 260 described with reference to FIG. 2.

A current source type switching circuit unit 511 of a current source type power supply apparatus 510 illustrated in FIG. 5 may include a first switch S1 and a second switch S2. Here, the first and second switches S1 and S2 operate complementarily to each other and have a short dead time. When the first switch S2 is turned on, energy is stored in the transformer T, and when the first switch S1 is turned off, the energy stored in the transformer T is transferred to secondary circuits 220 and 240.

In addition, a capacitor Cb connected in series to a primary coil of the transformer T stores or discharges energy according to a direction of current flowing through the primary coil of the transformer T, and resonates with the leakage inductance of the transformer T while current flows through a secondary coil of the transformer T.

Figure 6:
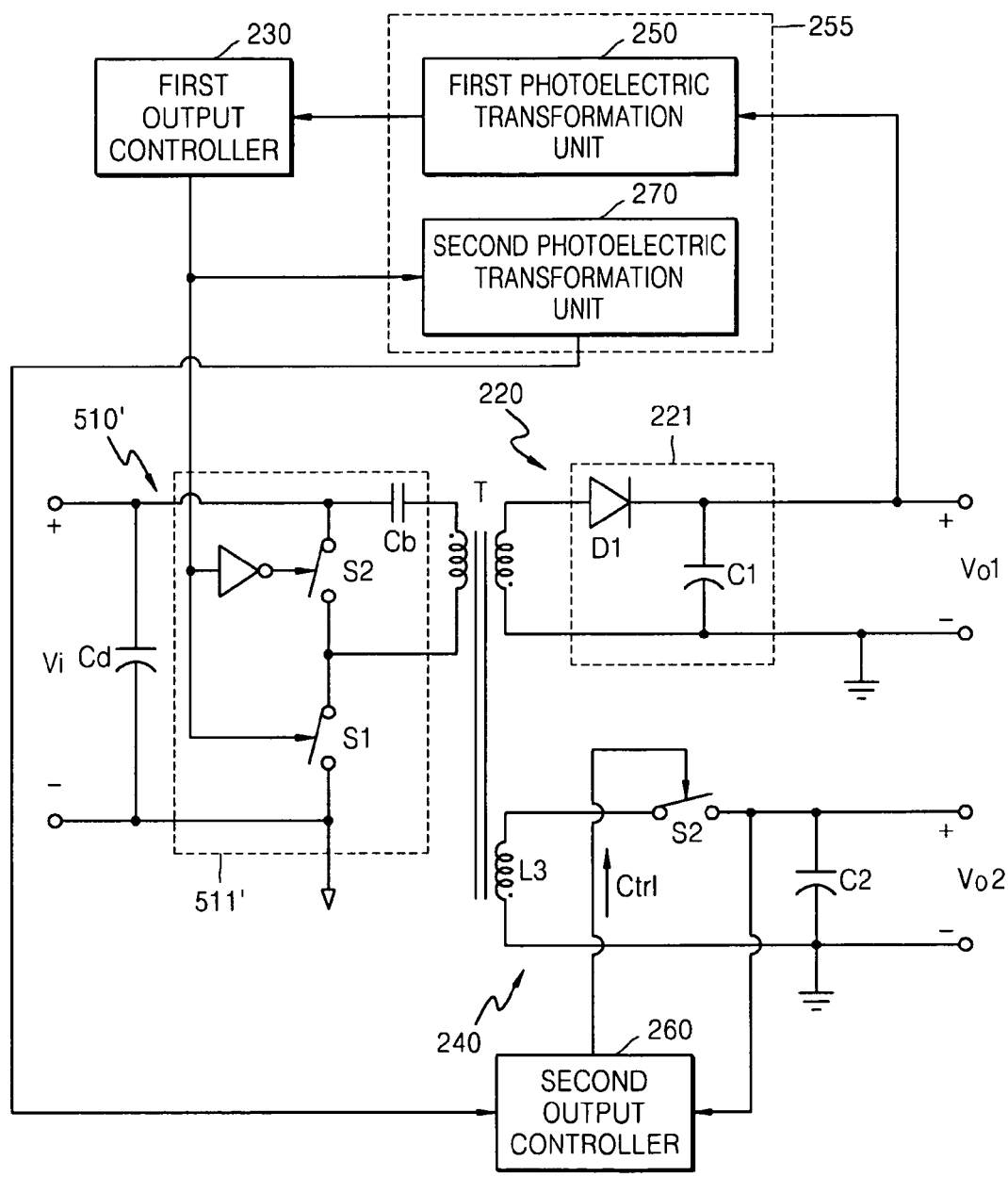
FIG. 6 is a circuit diagram illustrating another configuration that can be applied to the current source type power supply apparatus having multiple outputs illustrated in FIG. 5.

FIG. 6 is a circuit diagram illustrating another configuration that can be applied to the current source type power supply apparatus having multiple outputs illustrated in FIG. 5. A current source type switching circuit unit 511' of a primary circuit 510' illustrated in FIG. 6 has the same operations as those of the current source type switching circuit unit 511 illustrated in FIG. 5, a thus a detailed description thereof will be omitted.

Figure 7:
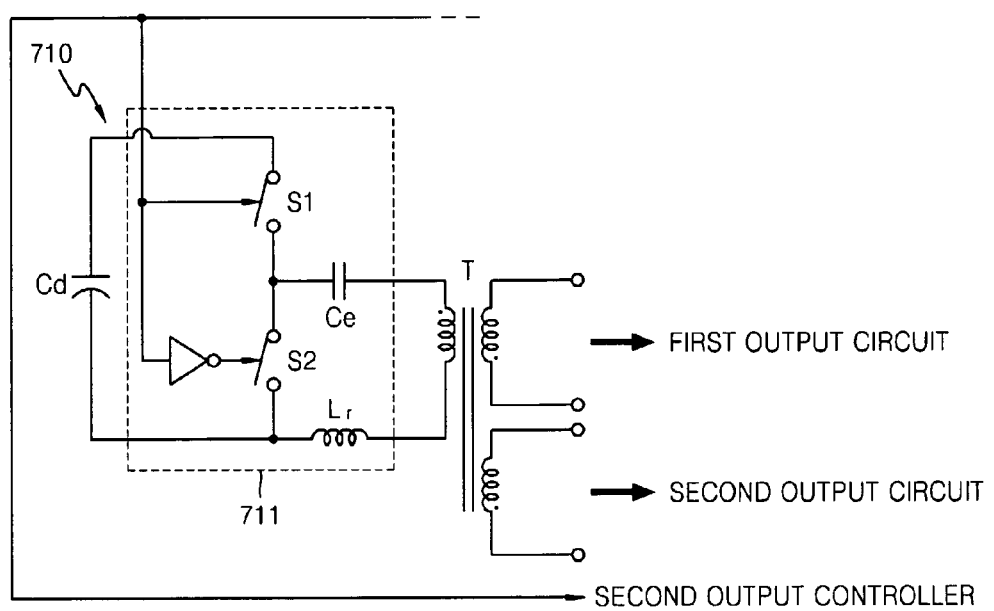
FIG. 7 is a circuit diagram for explaining a power supply apparatus having multiple outputs according to another embodiment of the present disclosure.

FIG. 7 is a circuit diagram for explaining a power supply apparatus having multiple outputs according to another embodiment of the present disclosure. In FIG. 7, a series-resonant type circuit is illustrated.

Referring to FIG. 7, a current source type switching circuit unit 711 of a primary circuit 710 may include a first switch S1 and a second switch S2. Here, the first and second switches S1 and S2 operate complementarily to each other and have a short dead time. In addition, an inductor Lr connected in series to a capacitor Ce is leakage inductance of the transformer T or an inductor additionally added to the transformer T.

While the first switch S1 is in the ON state or the OFF state, the capacitor Ce and the inductor Lr resonate with each other, and energy is transferred to secondary circuits by the transformer T operated as a current source.

Figure 8:
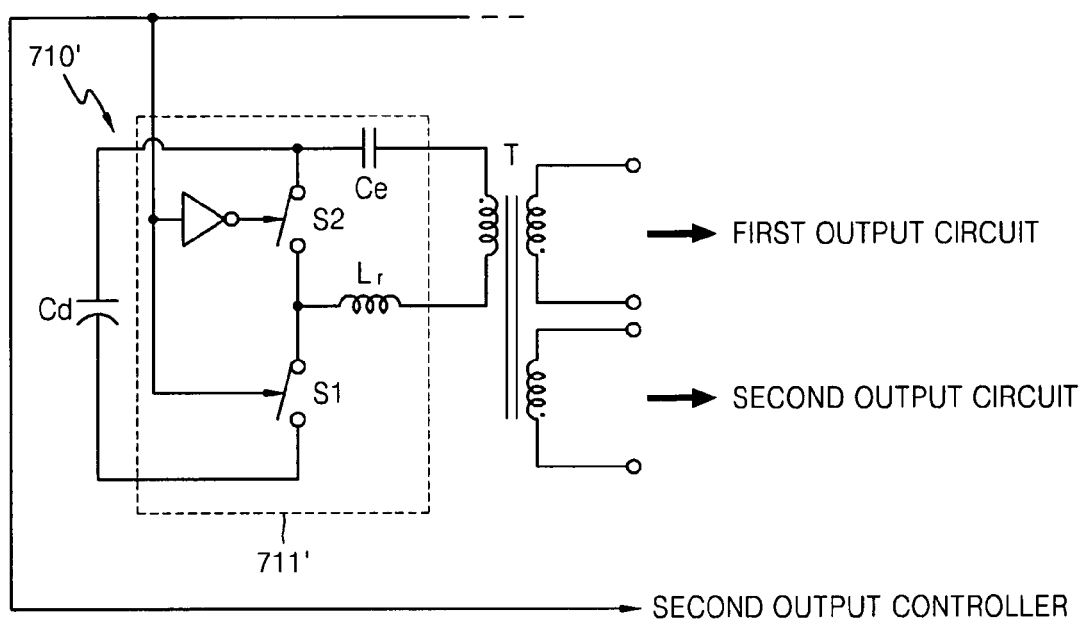
FIG. 8 is a circuit diagram illustrating another configuration that can be applied to the current source type power supply apparatus having multiple outputs illustrated in FIG. 7.

FIG. 8 is a circuit diagram illustrating another configuration that can be applied to the current source type power supply apparatus having multiple outputs illustrated in FIG. 7.

A current source type switching circuit unit 711' of a primary circuit 710' illustrated in FIG. 8 has the same operations of those of the current source type switching circuit unit 711 illustrated in FIG. 7, and thus a detailed description thereof will be omitted.

Figure 9:
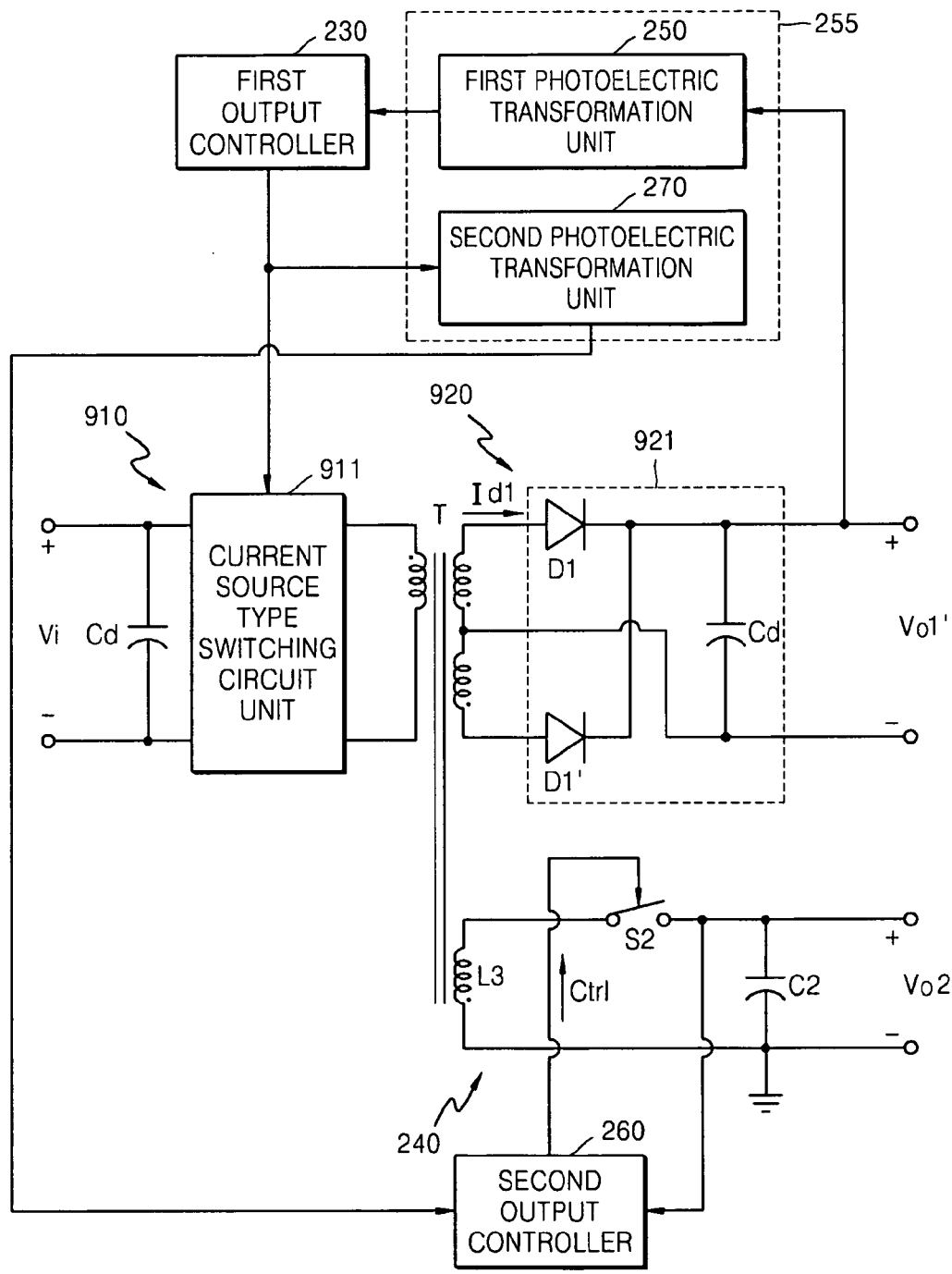
FIG. 9 is a circuit diagram for explaining a power supply apparatus having multiple outputs according to another embodiment of the present disclosure.

FIG. 9 is a circuit diagram for explaining a power supply apparatus having multiple outputs according to another embodiment of the present disclosure. In FIG. 9, a first output circuit 920 includes a full-wave rectifier 921 which can perform a full-wave rectifying operation.

A current source type switching circuit unit 911 of a current source type power supply apparatus 910 illustrated in FIG. 9 may be one of the types illustrated in FIGS. 2, and 4 to 8.

The first output circuit 920 includes two current paths to perform the full-wave rectifying operation on currents transferred from the transformer T, and diodes D1 and D1' are provided to the two paths, respectively. Therefore, according to a switching operation performed by the current source type switching circuit unit 911, one of the two paths is repeatedly turned on to enable the two paths to alternately perform the rectifying operation, so that a full-wave-rectified first output voltage Vo1' is output.

According to the aforementioned embodiments of the present disclosure, the power supply apparatus having multiple outputs can individually control a plurality of output circuits in the secondary side by using second to N-th output controllers having simple structures. In the configurations according to embodiments of the present disclosure, the size of the power supply apparatus having multiple outputs can be reduced as compared with a conventional current source type power supply apparatus. The inventor practically configures the current source type power supply apparatus. As a result, it can be seen that the sizes of circuits significantly reduce and individual control of the output voltage is achieved.

As described above, according to an embodiment of the present disclosure, a plurality of output circuits are provided in the secondary side of the transformer T, and an output voltage of each output circuit is individually controlled. In addition, power losses reduce and the efficiency increases, a simple configuration can be implemented, and stable control of the output voltages of the multiple outputs can be achieved.

While the present disclosure has been particularly shown and described with reference to exemplary embodiments thereof, it will be understood by those of ordinary skill in the art that various changes in form and details may be made therein without departing from the spirit and scope of the disclosure as defined by the appended claims.

According to the aforementioned embodiments, a case where the number of secondary output circuits is 2 is exemplified. However, it will be understood by those of ordinary skill in the art that a number of secondary multiple output circuits that can be individually controlled can be implemented according to the spirit and scope of the present disclosure.

While the power supply apparatus having multiple outputs according to the present disclosure has been particularly shown and described with reference to exemplary embodiments thereof illustrated in the attached drawings, it will be understood by those of ordinary skill in the art that various changes in form and details may be made therein without departing from the spirit and scope of the present disclosure as defined by the appended claims.

What is claimed is:

1. A power supply apparatus comprising:
   multiple outputs;
   a transformer;
   a first output circuit to generate a first output voltage with respect to power transferred to a secondary side of the transformer;
   a first output controller to generate a first control signal to control a primary side of the transformer based on the first output voltage;
   a second output circuit to generate a second output voltage with respect to the power transferred to the secondary side of the transformer;
   a second output controller to control an output of the second output voltage;
   a first photoelectric transformation unit to photoelectric-convert a first optical signal generated in response to the generated first output voltage into a first electric signal, and output the first electric signal to the first output controller; and
   a second photoelectric transformation unit to photoelectric-convert a second optical signal generated in response to the generated first control signal into a second electric signal, and to output the second electric signal to the second output controller,
   wherein the second output circuit comprises a second switch to perform a switching operation on the second output voltage of the second output circuit, and the second output controller controls the switching operation of the second switch by receiving the first control signal and the second output voltage,
   wherein the primary side of the transformer is insulated from the first output circuit and the second output circuit by the transformer, the first photoelectric transformation unit and the second photoelectric transformation unit, and
   wherein the first control signal is electrically insulated from the second output controller by the second photoelectric transformation unit.

2. The apparatus of claim 1,
   wherein the second output controller controls the switching operation of the second switch according to the output of the second photoelectric transformation unit and the second output voltage.

3. The apparatus of claim 1, wherein the first and second photoelectric transformation units are photo-couplers.

4. The apparatus of claim 1, wherein the second output controller of the apparatus turns off the second switch in response to an externally applied second control signal.

5. The apparatus of claim 1,
   wherein the second output circuit includes a capacitor connected to the second switch, and
   wherein the second switch is connected in series to the secondary side of the transformer, and output terminals for outputting the second output voltages are formed at both end portions of the capacitor.

6. The apparatus of claim 1, wherein the second switch includes a MOSFET (metal-oxide-semiconductor field-effect transistor) having a gate terminal connected to an output terminal of the second output controller.

7. The apparatus of claim 1, wherein the second switch includes a BJT (bipolar junction transistor).

8. The apparatus of claim 1, wherein the second output controller comprises:
   an output voltage detector detecting the second output voltage;
   an error detector comparing the second output voltage detected by the output voltage detector with a predetermined reference voltage and outputting an error value according to the result of the comparing; and
   a pulse width modulator outputting a switching control signal for controlling the switching operation of the second switch according to the first control signal and an output signal of the error detector.

9. The apparatus of claim 8, wherein the pulse width modulator of the apparatus outputs the switching control signal for turning off the second switch in response to an externally applied second control signal.

10. The apparatus of claim 8, wherein the output voltage detector is a voltage divider circuit.

11. The apparatus of claim 8, wherein the reference voltage is generated by a resistor or a zener diode connected between a predetermined voltage source and a grounding terminal.

12. The apparatus of claim 8,
   wherein the second output controller further includes a compensation circuit unit which provides a compensation circuit using negative feedback, and
   wherein the compensation circuit unit is connected in parallel to an output terminal of the error detector and an input terminal of the error detector applied with the second output voltage and includes a resistor and a capacitor which are connected in series.

13. The apparatus of claim 1, wherein a primary circuit of the transformer comprises a current source type switching circuit unit including a first switch that performs a switching operation in response to the first control signal.

14. The apparatus of claim 13, wherein the current source type switching circuit unit is one of a flyback, active-clamp flyback, half-bridge flyback, and series-resonant type.

15. The apparatus of claim 13, wherein the current source type switching circuit unit further comprises a snubber circuit for preventing leakage inductance of the transformer.

16. The apparatus of claim 1, wherein the first output circuit comprises a rectifier for rectifying a power transferred from the transformer.

17. The apparatus of claim 16, wherein the rectifier is one of a half-wave rectifying circuit and a full-wave rectifying circuit.

18. The apparatus of claim 1, wherein the primary side of the transformer comprises a current source type switching circuit unit including a first switch to perform a switching operation in response to the first control signal.

* * * * *

UNITED STATES PATENT AND TRADEMARK OFFICE
CERTIFICATE OF CORRECTION

PATENT NO. : 8,953,343 B2  
APPLICATION NO. : 12/662892  
DATED : February 10, 2015  
INVENTOR(S) : Jin-Ha Kim et al.

Page 1 of 1

It is certified that error appears in the above-identified patent and that said Letters Patent is hereby corrected as shown below:

On Title Page 2

Column 2, Item [56] (Other Publications), line 11, delete "iasued" and insert -- issued --, therefore Signed and Sealed this
Nineteenth Day of May, 2015

Michelle K. Lee
*Director of the United States Patent and Trademark Office*